US010793088B2

(12) United States Patent
Kong et al.

(10) Patent No.: US 10,793,088 B2
(45) Date of Patent: Oct. 6, 2020

(54) HANDLE DEVICE AND A TRUNK CARPET ASSEMBLY

(71) Applicant: FORD GLOBAL TECHNOLOGIES, LLC, Dearborn, MI (US)

(72) Inventors: Vic Kong, Nanjing (CN); Peter Zhang, Nanjing (CN); Gary D. Mullen, Plymouth, MI (US); Yoyo Ma, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 16/055,528

(22) Filed: Aug. 6, 2018

(65) Prior Publication Data
US 2018/0339664 A1 Nov. 29, 2018

Related U.S. Application Data

(62) Division of application No. 15/360,302, filed on Nov. 23, 2016, now Pat. No. 10,059,281.

(30) Foreign Application Priority Data

Dec. 22, 2015 (CN) .......................... 2015 1 0968773

(51) Int. Cl.
*B60R 13/01* (2006.01)
*B60N 3/04* (2006.01)
*B60R 5/04* (2006.01)

(52) U.S. Cl.
CPC ............ *B60R 13/013* (2013.01); *B60N 3/042* (2013.01); *B60R 5/04* (2013.01); *B60R 2013/016* (2013.01)

(58) Field of Classification Search
CPC ... B60R 13/013; B60R 5/04; B60R 2013/016; B60N 3/042; E05B 1/00; E05B 1/0015;
(Continued)

(56) References Cited

U.S. PATENT DOCUMENTS 2,874,986 A * 2/1959 Henrichs ................. E05C 1/145
292/167
3,552,158 A * 1/1971 Van Lengen ........... E05C 1/166
70/483
(Continued)

FOREIGN PATENT DOCUMENTS

CN 203472623 U 3/2014
CN 203805804 U 9/2014
(Continued)

OTHER PUBLICATIONS

Machine Translation of DE 19859306, 2020, pp. 1-8 (Year: 2020).*
(Continued)

*Primary Examiner* — Christine M Mills
(74) *Attorney, Agent, or Firm* — David Coppiellie; King & Schickli, PLLC (57) ABSTRACT

A handle device includes: a housing, a handle unit including a base portion and a handle portion. The base portion includes a first track and is pivotably connected to the housing. The handle portion includes a slider movable along the first track and a retractable first locking unit connected to a first side portion of the housing. The first locking unit is positioned at least partially within the first track in a locking position and positioned outside of the first track in an unlocking position.

15 Claims, 5 Drawing Sheets

(58) Field of Classification Search
CPC .. E05B 2001/0023; E05B 1/0092; E05B 5/00; E05B 5/006; E05B 63/0043; E05B 85/10; Y10S 292/10; Y10S 292/15; Y10S 292/63; Y10T 292/57; Y10T 292/03; Y10T 292/42; Y10T 292/432; Y10T 292/444

USPC ......... 292/336.3, 1, 300, 302, 304, DIG. 10, 292/DIG. 15, DIG. 63; 296/97.23, 37.14

See application file for complete search history.

(56) References Cited

U.S. PATENT DOCUMENTS

| | | | |
|---|---|---|---|
| 3,596,952 A * | 8/1971 | Hinkle | E05C 9/08 |
| | | | 292/27 |
| 3,635,608 A | 1/1972 | Crouch et al. | |
| 3,752,520 A * | 8/1973 | Sprick | E05C 1/04 |
| | | | 292/148 |
| 3,909,051 A * | 9/1975 | Nakai | E05C 1/166 |
| | | | 292/166 |
| 4,838,585 A | 6/1989 | Jondrow | |
| 5,056,846 A * | 10/1991 | Tanaka | B60R 5/04 |
| | | | 292/83 |
| 5,231,948 A * | 8/1993 | Malmanger | B63B 19/16 |
| | | | 114/201 R |
| 6,497,437 B1 * | 12/2002 | Munch | E05C 9/02 |
| | | | 292/139 |
| 6,578,896 B1 | 6/2003 | Peterson | |
| 7,083,205 B2 * | 8/2006 | Hall | E05B 63/14 |
| | | | 292/175 |
| 7,182,374 B2 * | 2/2007 | Figge | B60R 5/04 |
| | | | 292/334 |
| 7,475,933 B2 | 1/2009 | Doskocz | |
| 8,382,182 B2 | 2/2013 | Stossel | |
| 8,678,462 B2 * | 3/2014 | Simon | B60R 7/02 |
| | | | 296/24.33 |
| 8,840,166 B1 | 9/2014 | Derbes et al. | |
| 8,876,177 B2 * | 11/2014 | Takada | E05C 1/145 |
| | | | 292/170 |
| 9,062,474 B2 * | 6/2015 | Ibrahim | E05B 7/00 |
| 9,187,937 B2 * | 11/2015 | Schryer | B60N 3/026 |
| 10,059,281 B2 * | 8/2018 | Kong | B60N 3/042 |
| 10,434,955 B2 * | 10/2019 | Ono | B62D 25/2081 |
| 2002/0070563 A1 * | 6/2002 | Vitry | E05C 19/06 |
| | | | 292/175 |
| 2007/0205611 A1 * | 9/2007 | Taubert | E05C 1/10 |
| | | | 292/163 |
| 2014/0070560 A1 * | 3/2014 | Young | B60R 5/04 |
| | | | 296/37.14 |
| 2014/0265411 A1 | 9/2014 | Thota et al. | |
| 2018/0257573 A1 * | 9/2018 | Fleischer | B60R 5/044 |
| 2019/0145136 A1 * | 5/2019 | Jung | E05B 83/28 |
| | | | 292/336.3 |

FOREIGN PATENT DOCUMENTS

| | | | | |
|---|---|---|---|---|
| DE | 19859306 A1 | * | 6/2000 | ......... E05B 65/5238 |
| DE | 102009007451 A1 | * | 8/2010 | ............... B60R 5/04 |
| EP | 0713806 A1 | * | 5/1996 | ......... B60R 13/0206 |
| EP | 1526236 A2 | * | 4/2005 | ............... E05B 5/00 |
| EP | 1526237 A1 | * | 4/2005 | ............... E05C 3/24 |
| EP | 1826065 A1 | * | 8/2007 | ............. B60R 5/045 |
| EP | 3162637 A1 | * | 5/2017 | ........... E05B 1/0038 |
| GB | 636701 A | * | 5/1950 | ........... E05B 1/0015 |
| JP | 2006175977 A | * | 7/2006 | |
| JP | 2007291799 A | * | 11/2007 | |
| JP | 2009262847 A | * | 11/2009 | |
| JP | 2010120584 A | * | 6/2010 | |
| JP | 2014162288 A | * | 9/2014 | |
| WO | WO-0046473 A1 | * | 8/2000 | ............... E05C 1/10 |

OTHER PUBLICATIONS

Machine Translation of JP 2009262847, 2020, pp. 1-6 (Year: 2020).*

Machine Translation of JP 2014162288, 2020, pp. 1-5 (Year: 2020).*

English Machine Translation of CN203472623U.

English Machine Translation of CN203805804U.

* cited by examiner

HANDLE DEVICE AND A TRUNK CARPET ASSEMBLY

This application is a divisional of prior U.S. patent application Ser. No. 15/360,302 filed on Nov. 23, 2016, which claims priority to Chinese patent application no. 201510968773.3 filed on Dec. 22, 2015, the full disclosure of which is incorporated herein by reference.

TECHNICAL FIELD

The present application relates to a handle device and a trunk carpet assembly.

BACKGROUND

Often, a storage space is provided at the bottom portion of the trunk of a vehicle. A trunk carpet is often provided to detachably cover such a storage room, so that a space above may be available for users and the available storage space may be maximized. It is desired to provide a handle device for the trunk carpet, such that users can open and close the trunk carpet easily to access the storage space below the trunk carpet and that habits of various users for the handle device can be accommodated.

SUMMARY

According to one aspect of the present disclosure, a handle device is disclosed. The handle device comprises a housing, a handle unit and retractable first locking unit connected to a first side portion of the housing. The handle unit includes a base portion and a handle portion. The base portion includes a first track pivotably connected to the housing and the handle portion includes a slider movable along the first track. The first locking unit may be positioned at least partially within the first track in a locking position and positioned outside of the first track in an unlocking position.

In one embodiment, the housing may include a first end portion, a second end portion, and an inner wall to receive the handle unit. The base portion may include a front portion, a rear portion, and a first side wall and a second side wall extending between the front and rear portion. The first track may be formed as a longitudinal groove on the first side wall.

In another embodiment, the first locking unit may be positioned adjacent to the first end portion of the housing. The slider may enable or force the first locking unit to leave the first track to release the handle unit when the handle unit is received within the inner wall and the handle portion is positioned adjacent to the first end portion of the housing. The first locking unit may extend into the first track to lock the handle unit when the handle portion detaches from the first locking unit.

In another embodiment, the first locking unit may be formed with a first guiding surface having an angle relative to the second end portion of the housing.

In another embodiment, the slider may be formed with a second guiding surface having an angle relative to the second end portion of the housing.

In another embodiment, the first locking unit may be formed with a third guiding surface having an angle relative to a pivot direction.

In another embodiment, the end of the first locking unit is substantially hemispherical In another embodiment, the base portion may be formed with a fourth guiding surface having an angle relative to the pivot direction.

In another embodiment, the first locking unit may be connected to the housing via an elastic connector to be retractable in a direction substantially perpendicular to the first track.

In another embodiment, the first locking unit may include an elastic material.

In another embodiment, the base portion may have a first thickness, and the handle portion has a second thickness less than the first thickness.

In another embodiment, the handle unit may include a hook. The hook may be formed at the front end of the base portion and extends toward the bottom surface of the housing.

In another embodiment, the housing may include a stopper positioned at the bottom surface of the housing and adjacent to the first end portion. The hook may be positioned between the stopper and opposed inner wall when the handle unit is positioned within the inner wall of the housing.

In another embodiment, the base portion may further include a second track formed as a longitudinal groove in the second side wall of the base portion. The handle device may further include a retractable second locking unit connected to the second side portion of the housing, the second locking unit and the first locking unit may be matched in a direction substantially perpendicular to the second track.

According to an additional one or more embodiments, a handle device for a trunk carpet is provided. The trunk carpet comprises: (a) a housing secured to the trunk carpet; (b) a handle unit including a base portion and a handle portion, the base portion including a track and being pivotably connected to the housing, the handle portion including a slider movable within the first track, the handle unit further including a hook; and (c) a locking unit positioned on the housing, and retractable between a locking position and a unlocking position relative to the housing, wherein the locking unit is engaged with the track to lock the handle unit in the locking position and is detached from the track to release the handle unit from the housing in the unlocking position.

According to another one or more embodiments, a trunk carpet assembly for a vehicle is provided. The trunk carpet assembly comprises a trunk carpet and a handle device. The handle device may include: (a) a housing secured to the trunk carpet, the housing having a first end portion and a second end portion more adjacent to the rear end of the vehicle relative to the first end portion; (b) a handle unit receivable within the inner wall of the housing and including a base portion and a handle portion, the base portion having a rear end portion, a front end portion opposed to the rear end portion, and a track extending between the rear end portion and the front end portion, the rear end portion being pivotably connected to the housing adjacent to the second end portion, the handle portion including a slider movable along the track, the handle unit further including a hook positioned at the front end portion; and (c) a retractable locking unit connected to the housing adjacent to the front end portion. The locking unit may be retracted away from the track by the slider to release the handle unit when the handle portion is positioned at a released position adjacent to the front end portion, and the locking unit may be extended into the track to lock the handle unit with the housing when the handle portion is positioned at a locked position adjacent to the rear end portion.

In one embodiment, the base portion has a first thickness, and the handle portion has a second thickness less than the first thickness such that there is a space below the bottom surface of the handle portion to receive a user's fingers when the handle unit is received within the housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

As required, detailed embodiments are disclosed herein; however, it is to be understood that the disclosed embodiments are merely exemplary of the handle device that may be embodied in various and alternative forms. The figures are not necessarily to scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the handle device.

As disclosed herein, it is desired to provide a handle device which could meet various user requirements since users may have various habits on the use of the handles. A handle device and a vehicle trunk carpet assembly are provided herein which could enable users to operate the handle device differently, such as to operate the handle device with different finger orientations. In one embodiment, the handle device may include a hook which could be used to hang the trunk carpet, thus multi-functions are further provided.

FIG. 1 through FIG. 4B depict a handle device 100 according to one embodiment of the present disclosure. The handle device 100 includes a housing 110; a handle unit 170 including a base portion 130 and a handle portion 140, the base portion 130 including a first track 150 and being pivotably connected to the housing 110, the handle portion 140 including a slider 160 movable along the first track 150; and a retractable first locking unit 120 connected to the first side portion 112 of the housing 110, the first locking unit 120 being positioned at least partially within the first track 150 in a locking position and being positioned outside the first track in an unlocking position.

For illustration purposes, the handle device 100 is shown to be positioned at a vehicle trunk carpet herein. However, the handle device 100 may be used at other locations of the vehicle such as, including but not limited to, a door, a glove box, and a floor console. In addition, the handle device 100 may be utilized in a ship, an airplane, and a home or commercial storage bin, for example.

Figure 1:
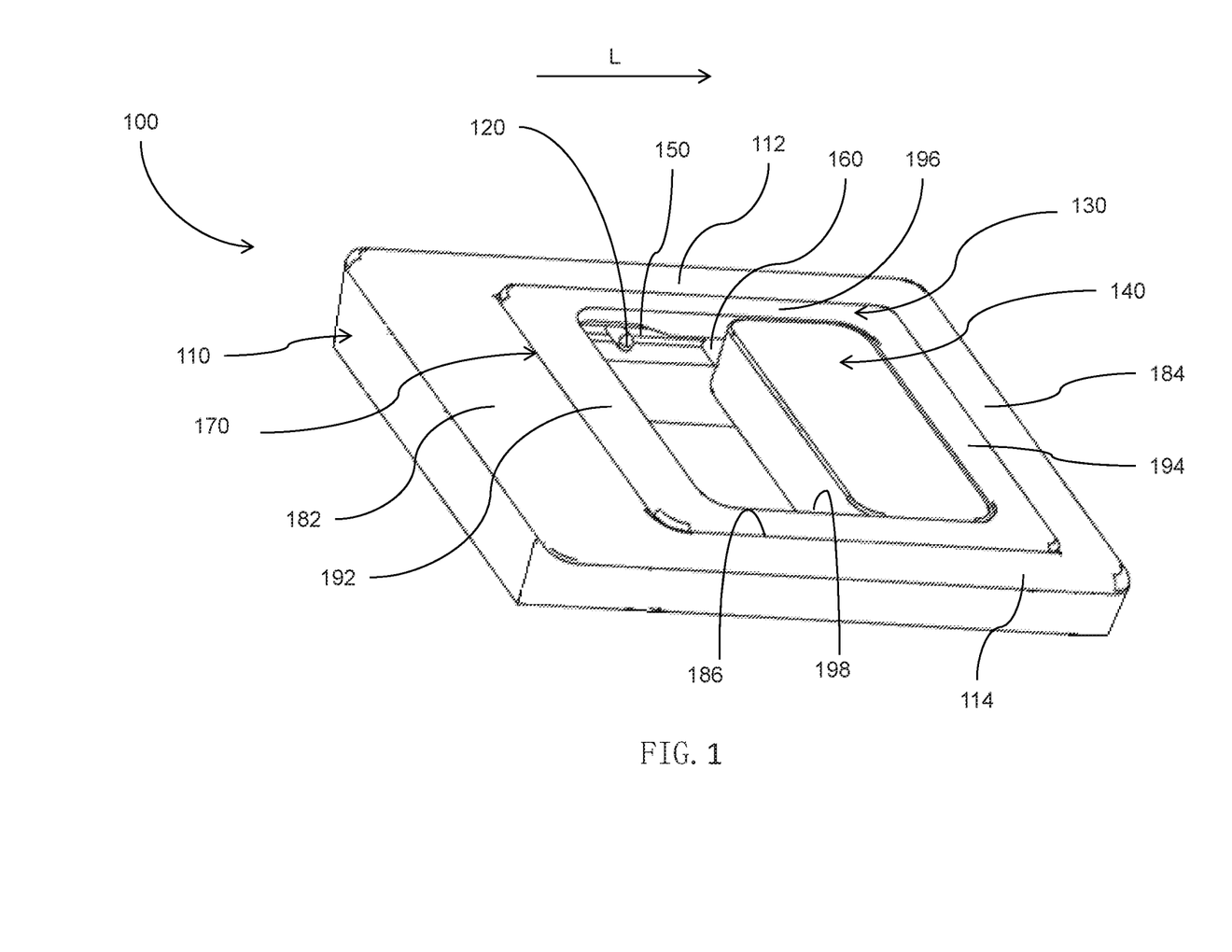
FIG. 1 shows a perspective view of a handle device according to one embodiment of the present disclosure, illustrating a locking unit being positioned in a locking position.
Figure 2A:
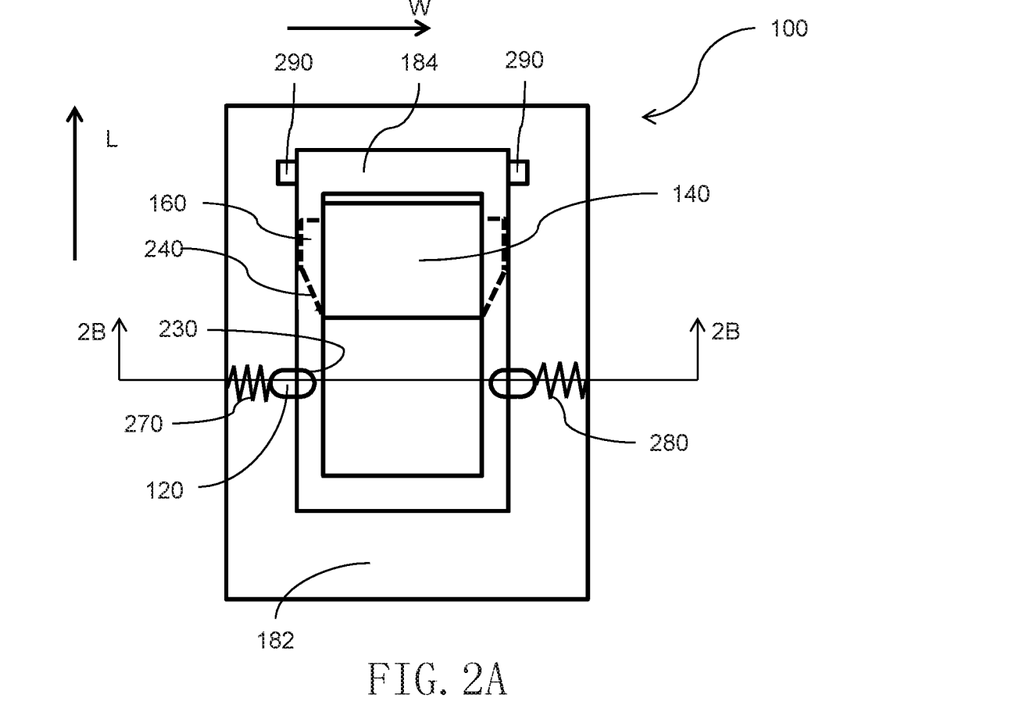
FIG. 2A schematically depicts a top view of the handle device as referenced in FIG. 1.
Figure 2B:
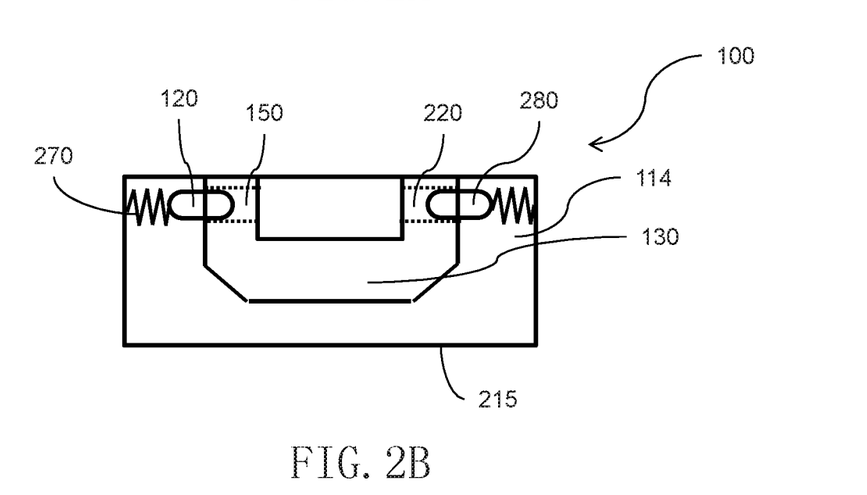
FIG. 2B schematically depicts a cross-sectional view of the handle device as referenced in FIG. 2A along line 2B-2B.

Referring to FIG. 1 through FIG. 2B, a handle device 100 is depicted as being in a locking position. For the sake of brevity, the housing 110, the base portion 130, and the handle portion 140 are shown to have a rectangular shape. It should be appreciated that in applications, these parts may have other shapes, such as trapezium, round, triangle, or any other regular or irregular shapes.

The housing 110 may include a first end portion 182, a second end portion 184, and a first side portion 112 and a second side portion 114 extending between the first end portion 182 and the second end portion 184. The first end portion 182, the second end portion 184, the first side portion 112, and the second side portion 114 define an inner wall 186 collectively, which may receive the handle unit 170. For the sake of brevity, the housing 110 is depicted as a single part. It should be appreciated that the housing 110 may be formed from separate parts and fixedly or detachably connected together. In the depicted embodiment, the housing 110 includes a bottom portion consisting of a plate. It should be appreciated that the housing 110 may be of other structures. In one example, the housing 110 may include a bottom portion with an opening. In another example, the housing 110 may be formed as a frame with the first end portion 182, the second end portion 184, the first side portion 112, and a second side portion 114 without a bottom portion.

Figure 4A:
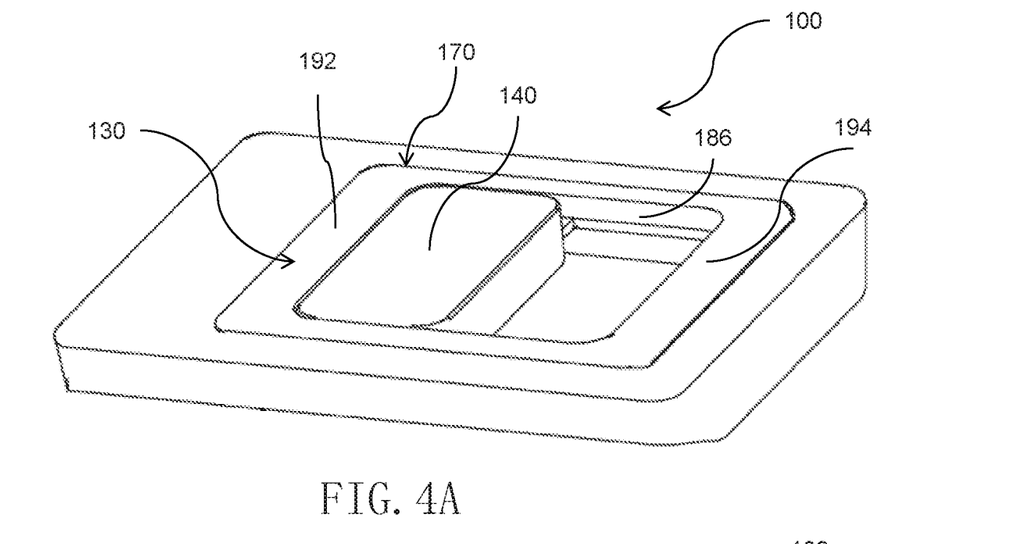
FIG. 4A schematically depicts a received position of the handle device in FIG. 1, illustrating the locking unit being positioned in an unlocking position.
Figure 4B:
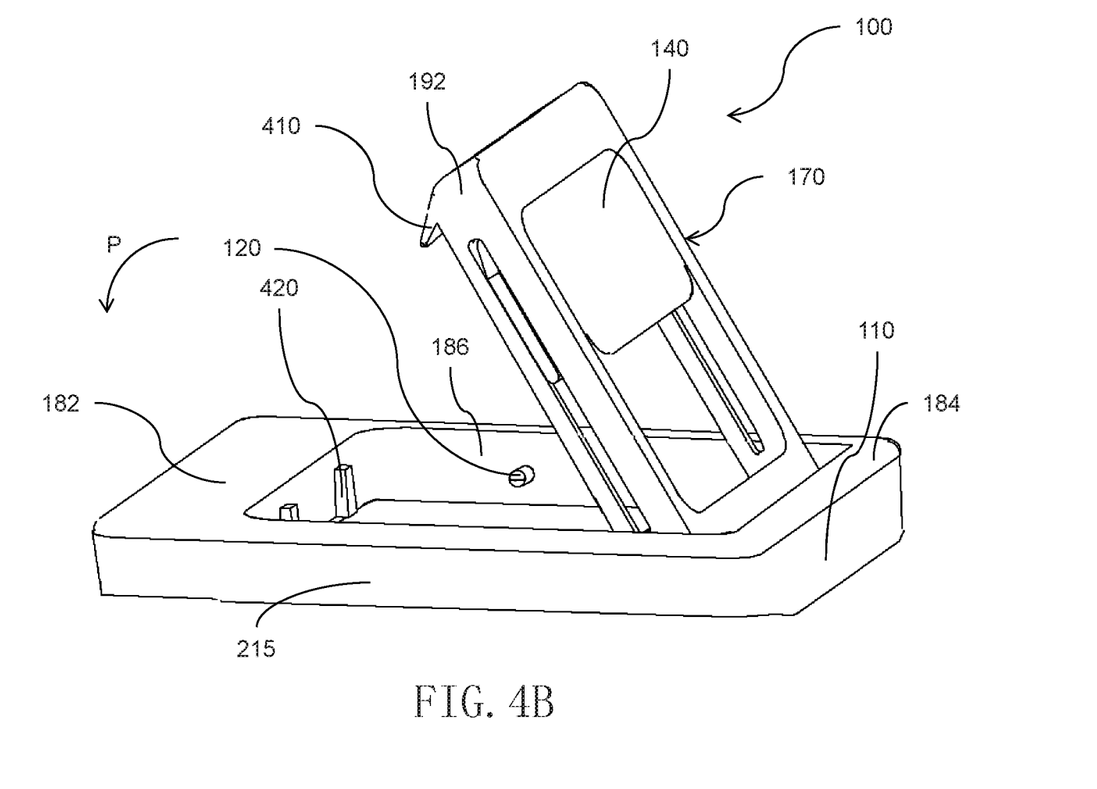
FIG. 4B schematically depicts an open position of the handle device in FIG. 1.

Referring back to FIG. 1, the handle unit 170 may include a base portion 130 pivotably connected to the housing 110 and a handle portion 140. By way of example, the base portion 130 may be pivotably connected to the housing 110 with a first connector 290 as shown in FIG. 2A, such that the base portion 130 may pivot as relative to the housing 110 between a received position as shown in FIG. 4A and an open position as shown in FIG. 4B. As depicted in FIG. 4A, in the received position, the base portion 130 or the handle unit 170 may be received within the inner wall 186 of the housing 110. As depicted in FIG. 4B, in the open position, the base portion 130 or the handle unit 170 may be at least partially detached from the inner wall 186 of the housing 110. In some embodiments, the first connector 290 may include an elastic connector elastically biased toward the received position, such as an elastic hinge. In this way, the handle unit 170 may be retrieved from the open position to the received position after usage, avoiding unintended vibration and noise generated while the vehicle is operating.

The housing 110 and the handle unit 170 may be formed from plastic or similar material. The first connector 290 may be formed from metal material. It should be appreciated that the handle device 100 may be formed from any other materials that provide sufficient strength.

Referring back to FIG. 1, the base portion 130 may include a front portion 192, a rear portion 194, and a first side wall 196 and a second side wall 198 extending between the front and rear portions 192, 194. The inner wall 186 may be configured to be closed to the base portion 130 such as in contact with the base portion 130. Such configuration can provide better appearance and prevent noise due to vibration generated while the vehicle is operating. In other embodiments, considering the tolerance requirements during manufacturing and assembling, a clearance may exist between the inner wall 186 of the housing 110 and the base portion 130.

Further, the base portion 130 may include a first track 150. In the depicted embodiment, the first track 150 is shown as a longitudinal groove formed on the first side wall 196, such as a through channel extending along the longitudinal direction L of the handle device 100 and at least partially penetrating the first side wall 196 along a direction W. In other examples (not shown), the first track 150 may be formed as a separate part and attached to the first side wall 196.

Figure 3A:
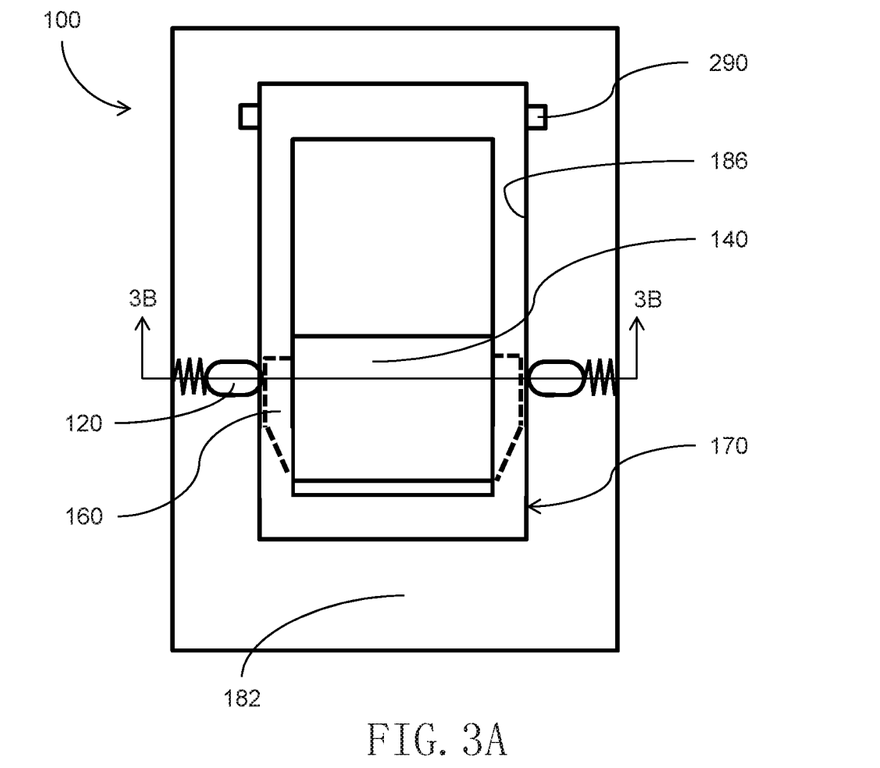
FIG. 3A schematically depicts a top view of the handle device as referenced in FIG. 1, illustrating the locking unit being positioned in an unlocking position.

The handle portion 140 may be at least partially received within the base portion 130 and may slide along the first track 150. Specifically, the handle portion 140 may include a slider 160 which may slide along the direction L within the first track 150. In this way, through the movement of the slider 160 within the first track 150, the handle portion 140 may accordingly move along the first track 150 between a position adjacent to the rear portion 194 of the base portion 130 as shown in FIG. 1 and a position adjacent to the front portion 192 of the base portion 130 as shown in FIG. 4A. Referring back to FIG. 1, the handle device 100 may further include a first locking unit 120. The first locking unit 120 may be connected to the first side portion 112 of the housing 110, and may be retractable between a locking position as shown in FIG. 2A and an unlocking position as shown in FIG. 3A. In this way, the first locking unit 120 may be positioned at least partially within the first track 150 in the locking position, and may be positioned outside of the first track 150 in the unlocking position. Thus, the first locking unit 120 may be engaged with the first track 150 in a releasable manner, and integrate or connect the housing 110 and the handle unit 170 as a whole as described herein elsewhere. Referring to FIGS. 1, 2A, and 2B, in one or more embodiments, the first locking unit 120 may be connected to the first side portion 112 of the housing 110 via a second connector 270. The second connector 270 may include an elastic connector such as a spring, such that the first locking unit 120 may be retractable in a direction substantially perpendicular to the first track 150, such as in the width direction W of the handle device 100. In some embodiments, the first locking unit 120 may include a single elastic part, such as being composed of rubber, plastic, polymer, or any other elastic material known in the art. Alternatively, the first locking unit 120 may be connected to the housing 110 directly.

Figure 3B:
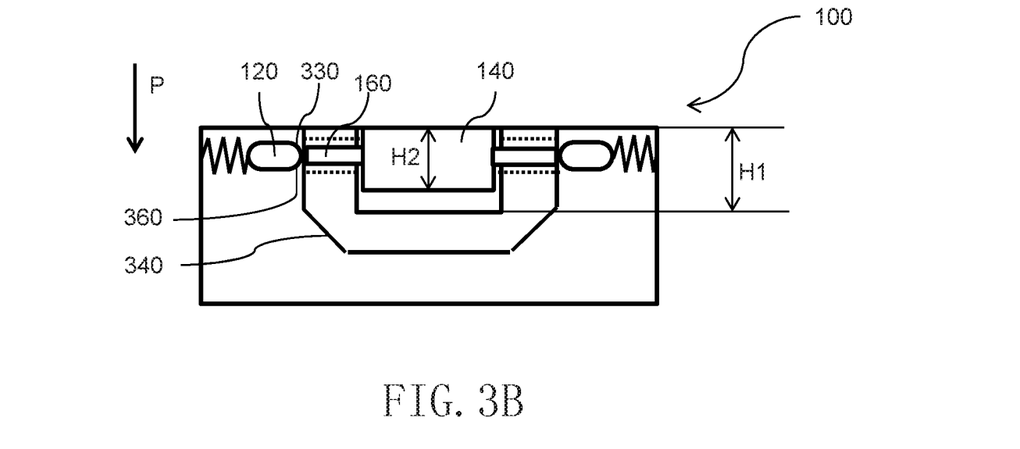
FIG. 3B schematically depicts a cross-sectional view of the handle device in FIG. 3A along line 3B-3B.

Referring to FIGS. 3A and 3B, in some embodiments, the first locking unit 120 may be positioned adjacent to the first end portion 182 of the housing 110. With the handle unit 170 positioned within the inner wall 186 of the housing 110, when the handle portion 140 is positioned adjacent to the first end portion 182, the slider 160 may contact the first locking unit 120 and enable the first locking unit 120 to leave the first track 150. In other words, referring to FIG. 4B, the handle portion 140 may be positioned in a release position to release the handle unit 170 such that the handle unit 170 could pivot relative to the housing 110. Now referring to FIGS. 4A and 4B, when the user is positioned at a location near the second end portion 184 of the housing 110, the user may insert his or her hand into a space below the handle portion 140 with palm oriented upwards and raise the handle unit 170 upwards and away from the user. Referring back to FIGS. 1 and 2A, the slider 160 may be detached from the first locking unit 120 when the handle portion 140 leaves the release position as shown in FIG. 3A, such that the first locking unit 120 may extend into the first track 150 to lock the handle unit 170. In another application, when the user is positioned at a location near the second end portion 184 of the housing 110, the user may insert his hand into a space below the handle portion 140 with palm oriented downwards, and then pull the handle device 100 upwards and toward the user. In this structure, the handle device 100 may provide a raise function and a pull function, thereby satisfying the user's habit of using the handle device.

Referring to FIGS. 2A and 2B, in some embodiments, the first locking unit 120 may be formed with a first guiding surface 230 to facilitate the movement between the locking position as shown in FIG. 2A and unlocking position as shown in FIG. 3A. The first guiding surface 230 may have an angle relative to the second end portion 184 of the housing 110 or relative to the retractable direction (such as the direction W) of the first locking unit 120, such as an angle of 30 degrees, 45 degrees, 60 degrees, or any other value greater than 0. Similarly, the slider 160 may have a second guiding surface 240 with an angle (such as an angle of 30 degrees, 45 degrees, 60 degrees, or any other value greater than 0) relative to the second end portion 184 of the housing 110 or relative to the retractable direction W. The first guiding surface 230 and the second guiding surface 240 may match or complement with each other to further facilitate the movement of the first locking unit 120. In this structure, when the handle portion 140 moves from the locked position as shown in FIG. 2A to the release position as shown in FIG. 3A, the slider 160 slides along the longitudinal direction L within the first track 150 until contacting the first guiding surface 230 of the first locking unit 120. Because the first guiding surface 230 and/or second guiding surface 240 has an angle relative to the retractable direction W of the first locking unit 120, contact between the slider 160 and the first locking unit 120 may generate a force on the first locking unit 120 such that the first locking unit 120 retracts out of the first track 150. For the purpose of illustration, the first guiding surface 230 is shown as a curve in the figures and the second guiding surface 240 is shown as to have a sloped surface. In other embodiments, the first and second guiding surface 230, 240 may be each of same or different shapes separately to support the movement of the first locking unit 120. Further, although the first and second guiding surface 230, 240 are both provided herein, in other embodiments not shown, only one of them may be provided.

Referring now to FIG. 4A, the handle device 100 is depicted with the handle unit 170 in its received position within the inner wall 186 of the housing 110. As shown, the handle portion 140 is positioned in the release position. As described above, when the handle portion 140 moves to its release position as shown in FIG. 3A, the slider 160 comes into contact with the first locking unit 120 and forces the first locking unit 120 to leave the first track 150, such that the handle unit 170 can be released from the housing 110 without a fixed connection. Thus, the user may insert his or her fingers into a space below the slider 160 with palm oriented upwards and pull the handle unit 170 upwards to the open position as shown in FIG. 4B. Moreover, the user may further pull the handle device 100 along with an article attached to the handle device 100. In this way, preferred use habits of various users may be met.

To facilitate the user in using the handle device 100, in some embodiments, the thickness of the handle portion 140 may be less than the thickness of the base portion 130, such that there is space between the handle portion 140 and the base portion 130 to receive the user's fingers. Specifically, referring to FIG. 3B, the base portion 130 may have a first thickness H1, and the handle portion 140 may have a second thickness H2 less than the first thickness H1.

Referring back to FIGS. 4A and 4B, the handle unit 170 may pivot from the received position shown in FIG. 4A to the open position shown in FIG. 4B via the first connector 290. In the open position, the handle unit 170 may be at least partially detached from the inner wall 186 of the housing 110, providing more operation space for users.

Further in one embodiment, the handle unit 170 may include a hook 410. As depicted in FIGS. 4A and 4B, the hook 410 may be formed at the front portion 192 of the base portion 130, and extrude toward the bottom 215 of the housing 110. In another embodiment (not shown), the hook 410 may be formed at the handle portion 140 and extrude toward the bottom 215 of the housing 110 in a similar manner. With the hook 410 formed at the handle unit 170, the user may at least temporary attach the handle unit 170 to a specific place as needed. FIG. 6B illustratively depicts an embodiment where the hook is employed for the vehicle trunk carpet. The handle device 100 may be used to pull the trunk carpet and may be used as a hook, providing more functions.

Referring back to FIG. 4B, the housing 110 may further include a stopper 420 positioned at the bottom 215 of the housing and adjacent to the first end portion 182. Thus, when the handle unit 170 is received within the inner wall 186 of the housing 110, the hook 410 may contact the stopper 420, providing a robust attachment for the handle unit 170 and housing 110. In this structure, the handle unit 170 and the housing 110 may be attached with each other even when the handle portion 140 is positioned in the release position, unless the handle unit 170 is pulled out.

When the handle unit 170 needs to be retrieved from the open position as shown in FIG. 4B to the received position as shown in FIG. 4A, the handle unit 170 may be pivoted downwardly along the pivot direction P as relative to the housing 110. The base portion 130 may contact the first locking unit 120 extending from the first side portion 112 of the housing 110 and enable the first locking unit 120 to retract back to the first side portion 112. Thus, the handle unit 170 may further pivot downwardly and back to its received position. Moreover, referring back to FIG. 3B, in some embodiments, to facilitate the movement of the first locking unit 120, the first locking unit 120 may be formed with a third guiding surface 330. The third guiding surface 330 may have an angle relative to the pivot direction P, such as an angle of 30 degrees, 45 degrees, 60 degrees, or any other value less than 90 degrees. Similarly, the base portion 130 may be formed with a fourth guiding surface 340 having an angle (such as an angle of 30 degrees, 45 degrees, 60 degrees, or any other value less than 90 degrees) relative to the pivot direction P to further facilitate the movement of the first locking unit 120. For the purpose of illustration, the third guiding surface 330 is shown as a curve in the figures, and the fourth guiding surface 340 is shown to have a sloped surface. In other embodiments, the third and fourth guiding surface 330, 340 may be each of same or different shapes separately to facilitate the movement of the first locking unit 120. Further, although the third and fourth guiding surface 330, 340 are both provided herein, in other embodiments not shown, only one of them may be provided. Moreover, although the first locking unit 120 is shown as including a curved surface 360 opposed to the third guiding surface 330, in other embodiments it may include a flat surface substantially perpendicular to the pivot direction P to provide better locking. In one embodiment, the end of the first locking unit 120 adjacent to the handle unit 170 may be substantially hemispherical.

In some embodiments and as depicted in FIG. 2B, the base portion 130 may further include a second track 220, such as a longitudinal groove formed in the second side wall 198 of the base portion 130. The handle device 100 may include a retractable second locking unit 280. Similar to the first locking unit 120, the second locking unit 280 may be connected to the second side portion 114 of the housing 110, and may be retractable between a locking position at least partially positioned within the second track 220 and an unlocking position out of the second track 220. As shown in the figures, the second locking unit 280 may correspond to the first locking unit 120 in the direction W. In other embodiments, the first and second locking units 120, 280 may have different relative positions. With both first and second locking units 120, 280, the handle unit 170 and housing 110 may be locked more robustly.

Figure 5:
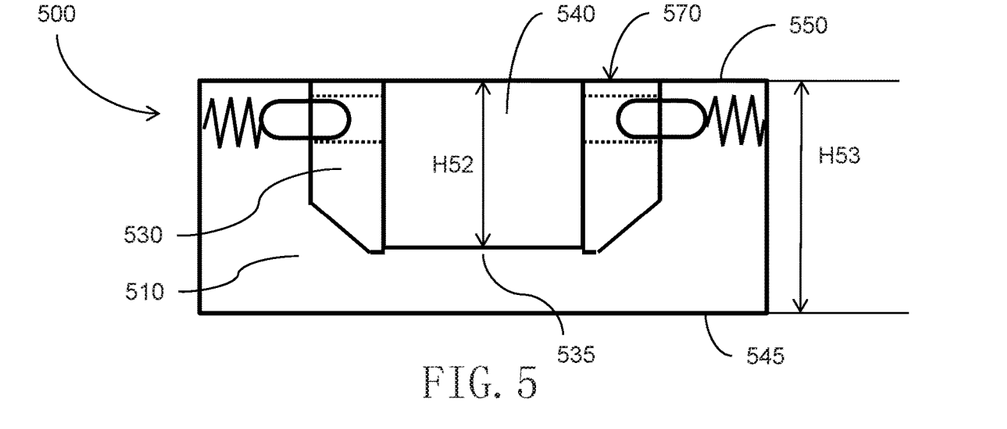
FIG. 5 schematically depicts a cross-sectional view of the handle device according to another embodiment of the present disclosure.

FIG. 5 depicts anther embodiment of the handle device 500 of the present disclosure. The handle device 500 may include a housing 510, and a handle unit 570 including a base portion 530 and a handle portion 540. For the sake of brevity, similar elements and features will not be described in detail. The bottom of the base portion 530 may be formed with an opening 535. As shown in FIG. 5, the handle portion 540 may be of a thickness H52. The housing 510 may include a space to receive the handle unit 570. A third thickness H53 may be defined between the lower surface 545 and the upper surface 550 of the housing 510, with H52<H53. Thus, a space is defined below the handle portion 540 to receive a user's fingers. Although the handle portion 540 is shown to be of a substantially similar thickness as the base portion 530, in other embodiments the handle portion 540 may be of a thickness less than that of the base portion 530, providing more space to receive a user's fingers. In another embodiment, the housing 510 may include a bottom portion with an opening. The opening of the housing 510 may be of same or different size as the opening 535 of the base portion 530.

Figure 6A:
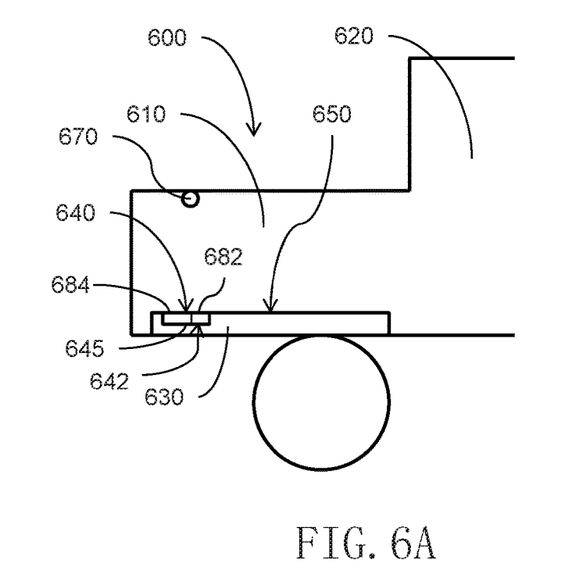
FIG. 6A-6B schematically depicts the handle device used with a vehicle trunk carpet according to one or more embodiments of the present disclosure.
Figure 6B:
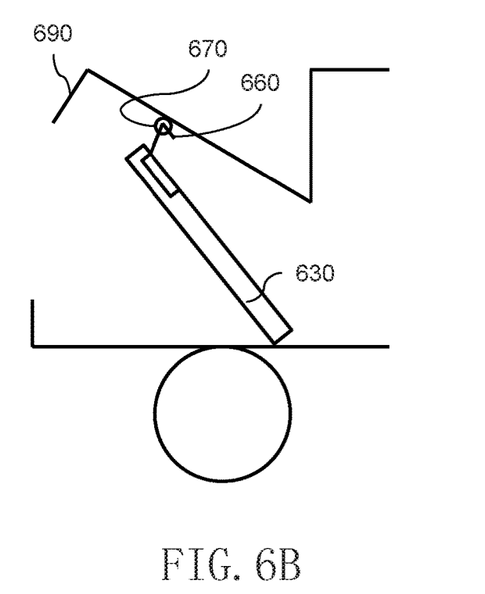

Referring now to FIGS. 6A and 6B, a handle device 640 according to one embodiment of the present disclosure is depicted which is implemented on a vehicle trunk carpet. The vehicle is generally indicated in 600, which may include a trunk 610 and a passenger compartment 620. A trunk carpet assembly 650 including a trunk carpet 630 and a handle device 640 is provided in the trunk 610. The housing 645 of the handle device 640 may be secured to the trunk carpet 630. The handle device 640 may be of the same or similar structures as shown in FIG. 1 through 5. The housing 645 may have a first end portion 682 and a second end portion 684. In the application depicted in FIGS. 6A and 6B, the second end portion 684 is more adjacent to the rear end of the vehicle 600 relative to the first end portion 682. When the handle portion 642 is positioned adjacent to the first end portion 682, a user facing the trunk 610 can insert his or her fingers under the handle portion 642 with his or her palm upwards to pull the handle portion 642 up and raise up the handle device 640. Thus, the user can pull up the trunk carpet 630 via the handle device 640. The base portion of the handle device 640 may include a hook 660 positioned at the front portion. In this way, the hook 660 may be hung at the connection point 670 located at the vehicle body, thus the trunk carpet 630 may be hung at the vehicle body temporarily, so that the storage space below the trunk carpet 630 may be easier to access. Thus, the handle device 640 provides an additional hanging function.

Referring to FIG. 6A, in another application, the user may move the handle portion 642 to a position adjacent to the second end portion 684. Thus, the user may insert his or her fingers into a space below the handle portion 642 with the palm oriented downwards to pull out the handle device 640 and the trunk carpet 630.

The handle device 640 may include a substantially flat upper surface. In the application shown in FIG. 6A, the upper surface of the handle device 640 may be substantially aligned with the upper surface of the trunk carpet 630 to provide a better appearance.

Although a common 4-door vehicle is shown in FIGS. 6A and 6B, it should be appreciated that the trunk carpet assembly 650 may be similarly employed in a 5-door vehicle or any other type of vehicles.

In one or more embodiments, the present disclosure provides a handle device and a vehicle trunk carpet assembly. One skilled in the art will readily recognize from such discussion, and from the accompanying drawings and claims that various changes, modifications and variations can be made therein without departing from the true spirit and fair scope of the handle device as defined by the following claims.

What is claimed is:

1. A handle device, comprising:
a housing,
a handle unit including a base portion and a handle portion, wherein the base portion includes a first track and is pivotably connected to the housing and the handle portion includes a slider movable along the first track and wherein said base portion has a first thickness and said handle portion has a second thickness less than said first thickness; and
a retractable first locking unit connected to a first side portion of the housing via an elastic connector retractable in a direction substantially perpendicular to the first track;
wherein the retractable first locking unit is positioned at least partially within the first track in a locking position and is positioned outside of the first track in an unlocking position.

2. The handle device of claim 1, wherein the housing includes a first end portion, a second end portion, and an inner wall to receive the handle unit, wherein the base portion includes a front portion, a rear portion, and a first side wall and a second side wall extending between the front portion and the rear portion, and wherein the first track is formed as a longitudinal groove on the first side wall.

3. The handle device of claim 2, wherein the retractable first locking unit is positioned adjacent to the first end portion of the housing; wherein when the handle unit is received within the inner wall and the handle portion is positioned adjacent to the first end portion of the housing, the slider of the handle portion enables the retractable first locking unit to leave the first track to release the handle unit; and wherein the retractable first locking unit extends into the first track to lock the handle unit when the handle portion is apart from the first locking unit.

4. The handle device of claim 3, wherein the retractable first locking unit is formed with a first guiding surface having an angle relative to the second end portion of the housing.

5. The handle device of claim 3, wherein the slider is formed with a second guiding surface having an angle relative to the second end portion of the housing.

6. The handle device of claim 3, wherein the handle unit includes a hook, and the hook is formed at the front portion of the base portion and extends toward a bottom surface of the housing.

7. The handle device of claim 6, wherein the housing includes a stopper positioned at the bottom surface of the housing and adjacent to the first end portion of the housing, and the hook is positioned between the stopper and an opposed inner wall when the handle unit is positioned within the inner wall of the housing.

8. The handle device of claim 2, wherein the base portion further includes a second track formed as a second longitudinal groove in the second side wall of the base portion; wherein the handle device further includes a retractable second locking unit connected to a second side portion of the housing, the retractable second locking unit corresponds to the retractable first locking unit in a direction substantially perpendicular to the second track.

9. The handle device of claim 1, wherein the retractable first locking unit is formed with a first guiding surface having an angle relative to a pivot direction.

10. The handle device of claim 1, wherein the base portion is formed with a second guiding surface having an angle relative to a pivot direction.

11. The handle device of claim 1, wherein an end of the retractable first locking unit is substantially hemispherical.

12. The handle device of claim 1, wherein the retractable first locking unit includes an elastic material.

13. A trunk carpet assembly for a vehicle, comprising:
a trunk carpet; and
a handle device, including:
a housing secured to the trunk carpet, the housing having a first end portion and a second end portion more adjacent to a rear end of the vehicle than the first end portion,
a handle unit receivable within an inner wall of the housing and including a base portion and a handle portion, wherein the base portion includes a rear end portion, a front end portion opposed to the rear end portion, and a track extending between the rear end portion and the front end portion, the rear end portion is pivotably connected to the housing adjacent to the second end portion, the handle portion including a slider movable along the track, and wherein the handle unit further includes a hook positioned at the front end portion; and
a retractable locking unit connected to the housing adjacent to the front end portion;

wherein the retractable locking unit retracts away from the track by the slider to release the handle unit when the handle portion is positioned at a released position adjacent to the front end portion, and the retractable locking unit extends into the track to lock the handle unit with the housing when the handle portion is positioned at a locked position adjacent to the rear end portion.

14. The trunk carpet assembly of claim 13, wherein the base portion has a first thickness, and the handle portion has a second thickness less than the first thickness such that there is a space below a bottom surface of the handle portion to receive a user's fingers when the handle unit is received within the housing.

15. A handle device, comprising:
   a housing including a first end portion, a second end portion and an inner wall,
   a handle unit, received in the inner wall, including a base portion and a handle portion, wherein the base portion includes a front portion, a rear portion, a first sidewall, a second sidewall and a first track formed as a longitudinal groove on the first side wall said base portion being pivotably connected to the housing and wherein the handle portion includes a slider movable along the first track and wherein said base portion has a first thickness and said handle portion has a second thickness less than said first thickness; and
   a retractable first locking unit connected to a first side portion of the housing;
   wherein (a) the retractable first locking unit is positioned at least partially within the first track in a locking position and is positioned outside of the first track in an unlocking position, (b) the retractable first locking unit is positioned adjacent to the first end portion of the housing, (c) when the handle unit is received within the inner wall and the handle Portion is positioned adjacent to the first end portion of the housing, the slider of the handle portion enables the retractable first locking unit to leave the first track to release the handle unit and (d) the retractable first locking unit extends into the first track to lock the handle unit when the handle portion is apart from the first locking unit.

* * * * *